INVENTOR
JOSEPH THEAKSTON

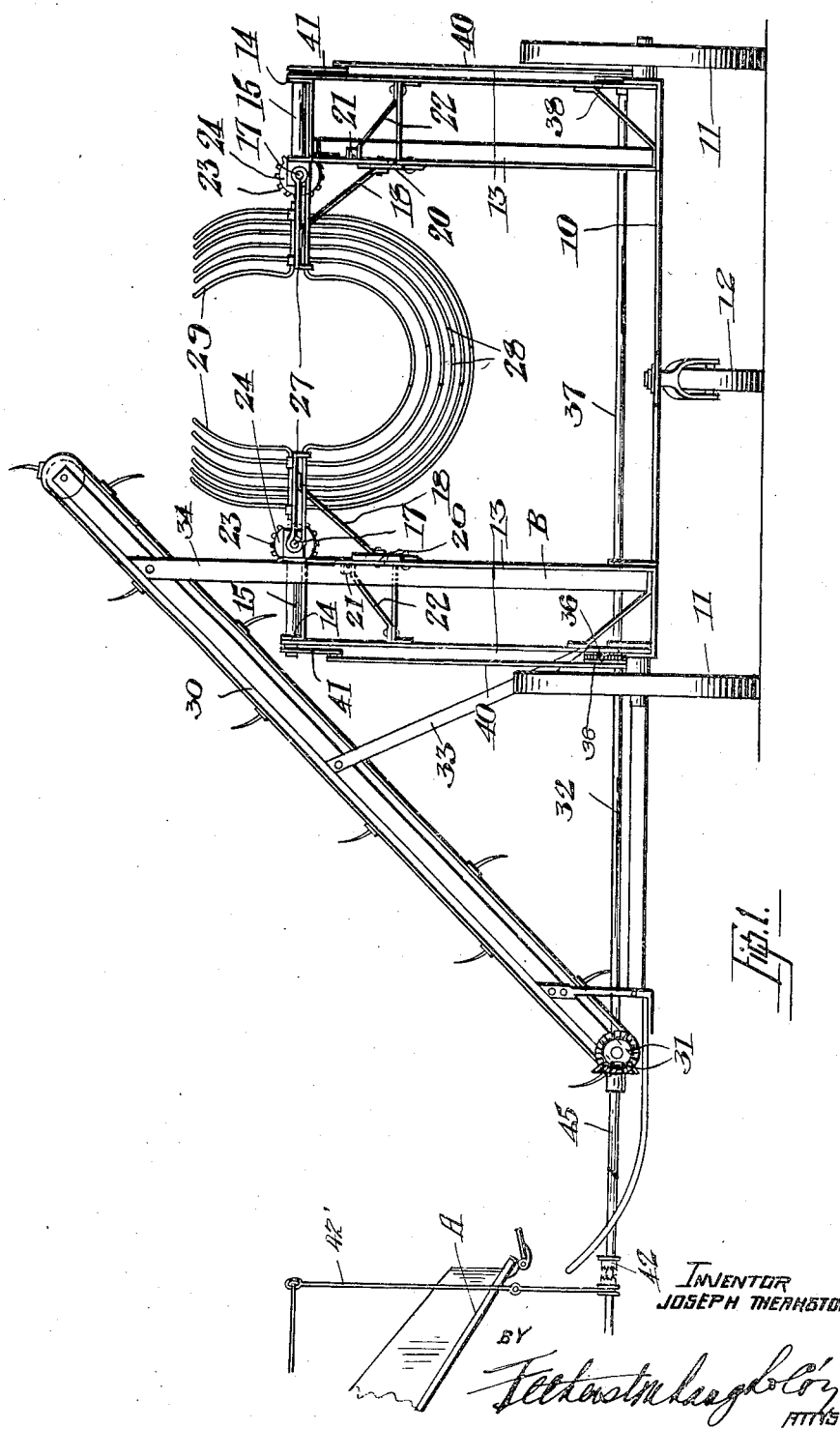

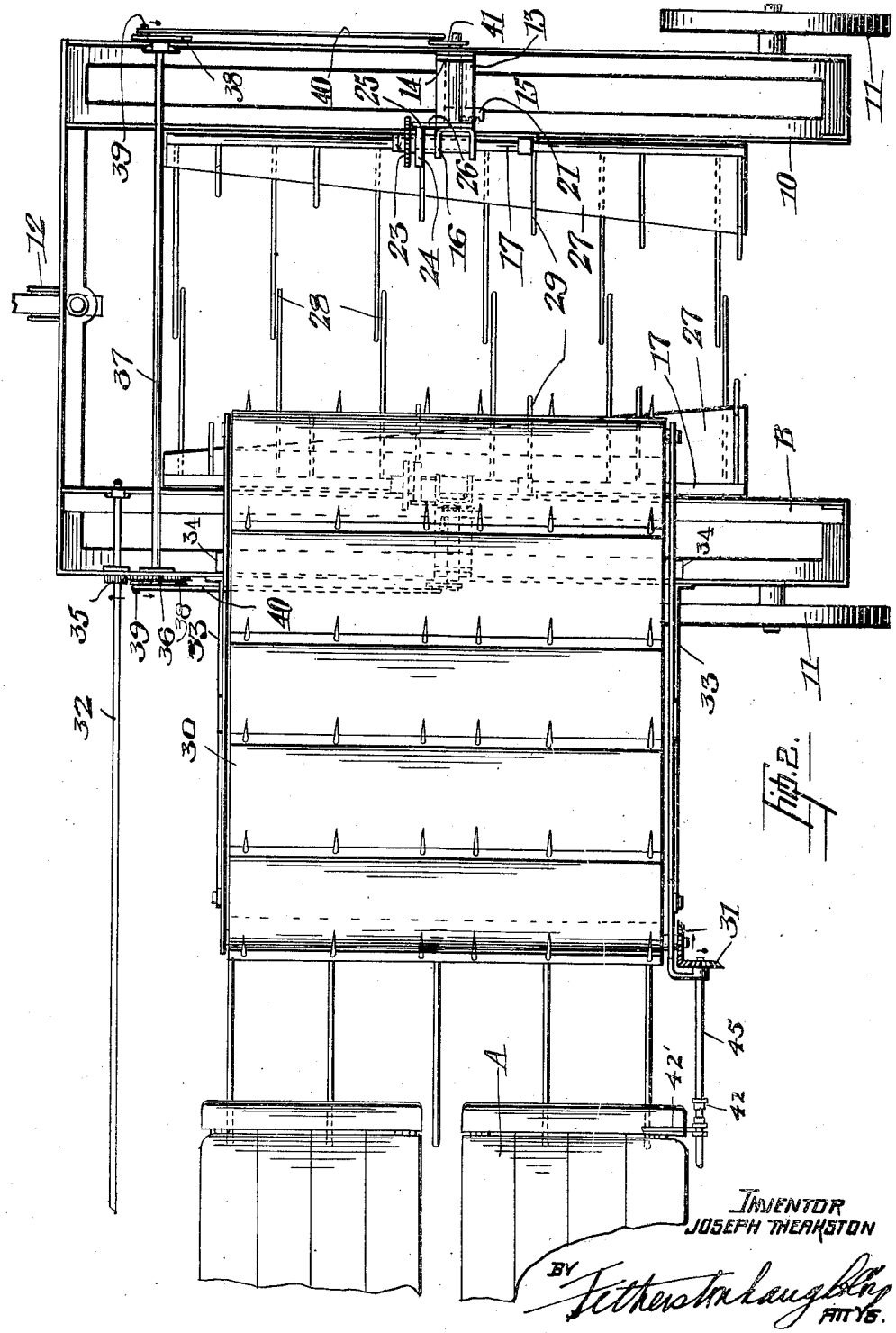

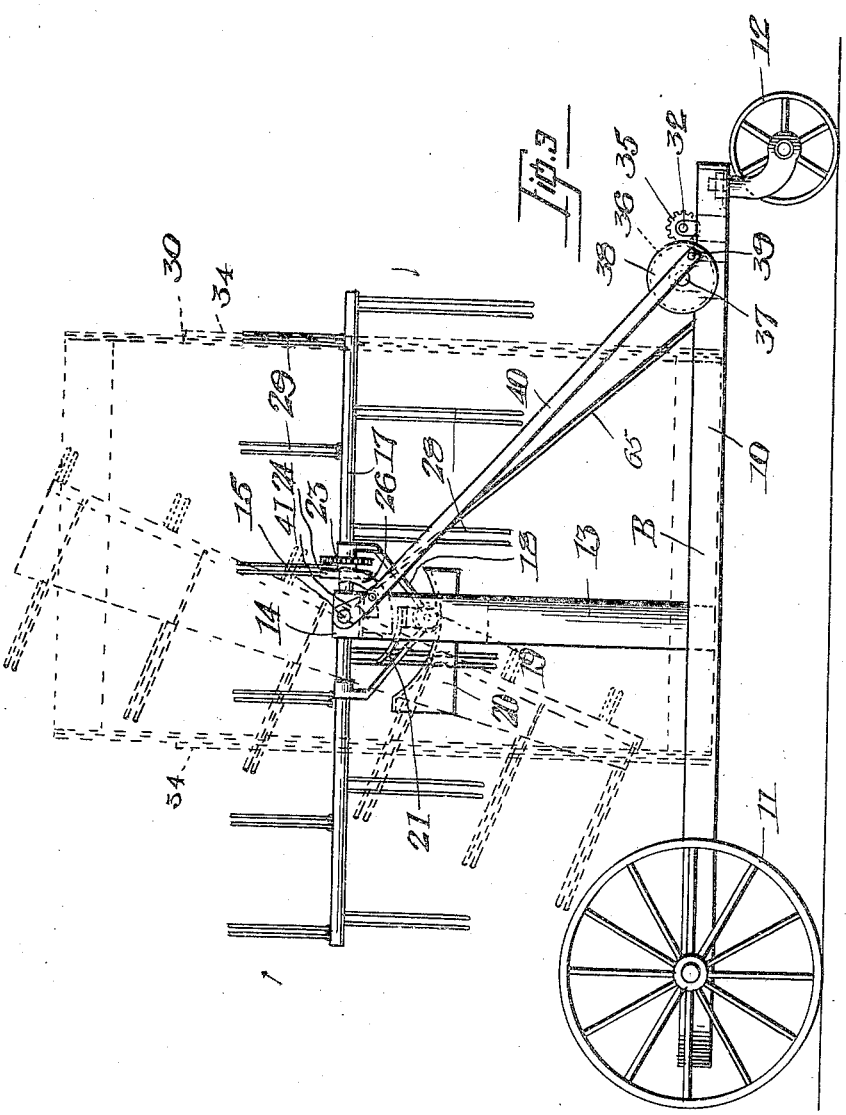

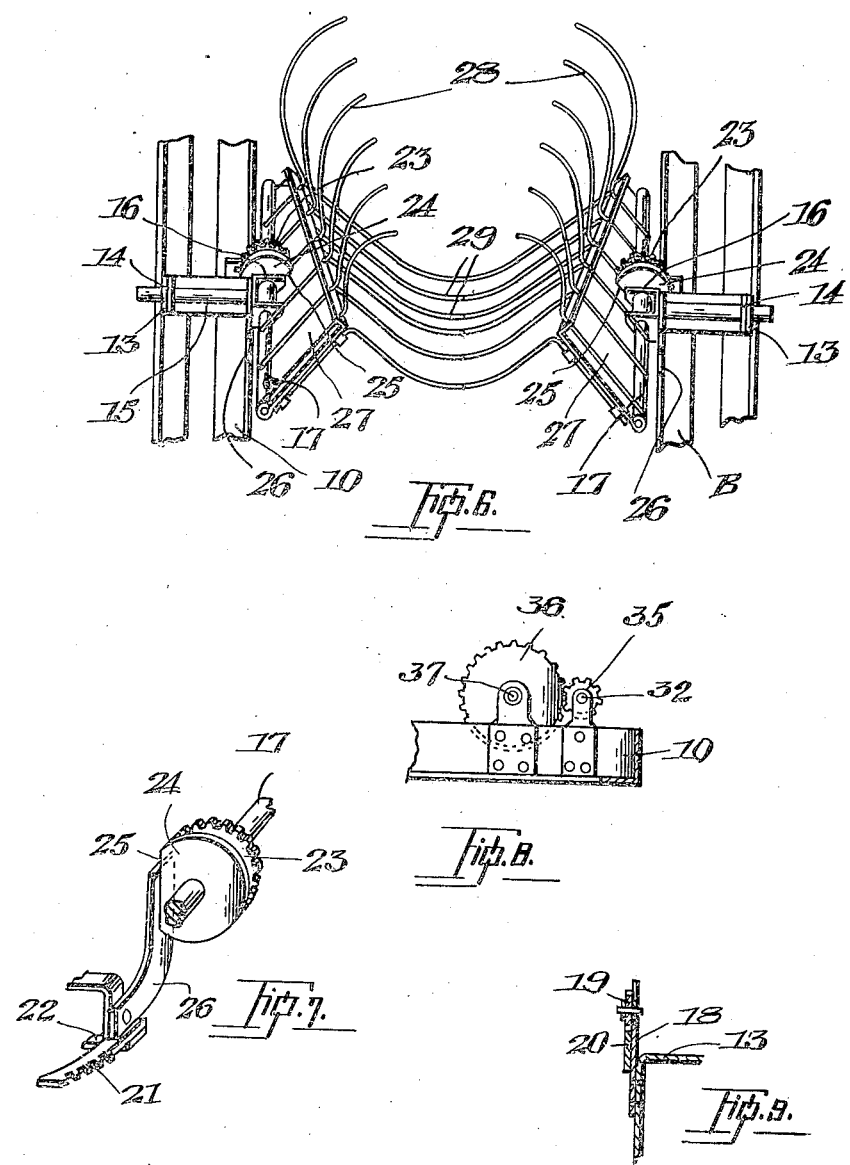

Patented Jan. 23, 1923.

1,443,293

UNITED STATES PATENT OFFICE.

JOSEPH THEAKSTON, OF REGINA, SASKATCHEWAN, CANADA.

SHEAVE SHOCKER.

Application filed August 13, 1920. Serial No. 403,420.

*To all whom it may concern:*

Be it known that I, JOSEPH THEAKSTON, a subject of the King of Great Britain, and resident of the city of Regina, in the Province of Saskatchewan and Dominion of Canada, have invented certain new and useful Improvements in Sheave Shockers, and do hereby declare that the following is a full, clear, and exact description of my invention, such as will enable those skilled in the art to which it appertains to make and use the same.

This invention relates to improvements in sheave shockers and the objects of the invention are, to facilitate bunching a plurality of sheaves together and dumping them in the form of a shock, to permit of the sheave-receiving basket being constructed in such a manner that when in a dumping position the two portions of the basket will open rearwardly and dump the sheaves deposited therein and at the same time give adequate clearance, so that the basket will not impact with the shock and tend to knock the same over, to permit of the butts of the sheaves spreading during the dumping operation and at the same time bunching the heads of the sheaves together and generally to adapt the several parts to better perform the functions required of them.

With the above and other objects in view, the invention consists essentially of the improved construction and arrangement of parts particularly described and set forth in the following specification and accompanying drawings forming part of the same.

In the drawings:—

Figure 1 is a rear view of the shocker as seen when attached stubbleward of a binder deck.

Figure 2 is a plan view of the same.

Figure 3 is a side elevation of the shocker with the basket in a horizontal position for receiving the sheaves, the dotted lines indicating the position of the basket during the dumping operation.

Figure 6 is a fragmentary plan view of a part of the frame showing the basket in the act of being rotated to dump the sheaves.

Figure 7 is a perspective view of one of the hinge rods of the basket showing the gear thereon which co-acts with an arcuate rack to open the basket.

Figure 8 is a side elevation of a portion of the frame showing the drive gear and driven gear by means of which the basket is actuated.

Figure 9 is a vertical section on the line 9—9 of Fig. 4.

Like characters of reference refer to like parts of the several figures.

Referring to the drawings:—

Figure 5:
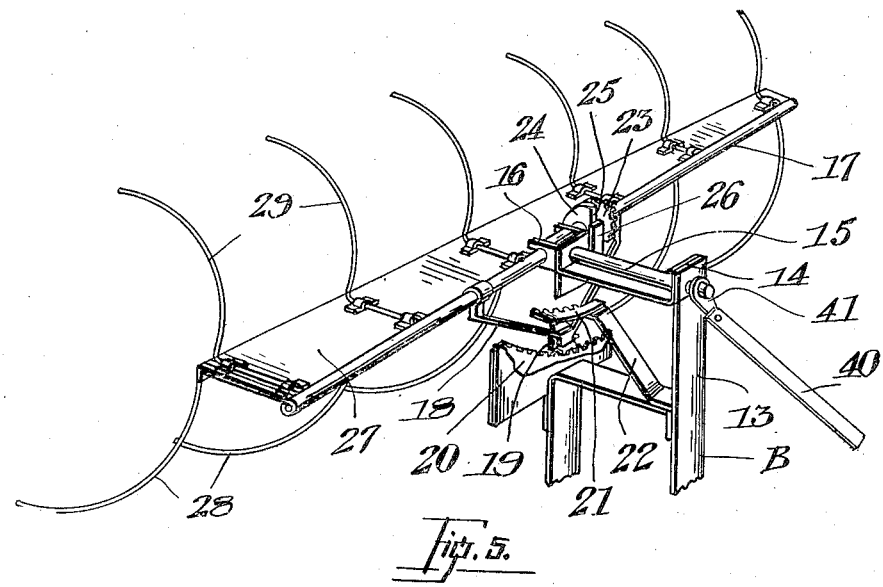
Figure 5 is a perspective view of the upper portion of one of the standards on which the basket is mounted.
Figure 4:
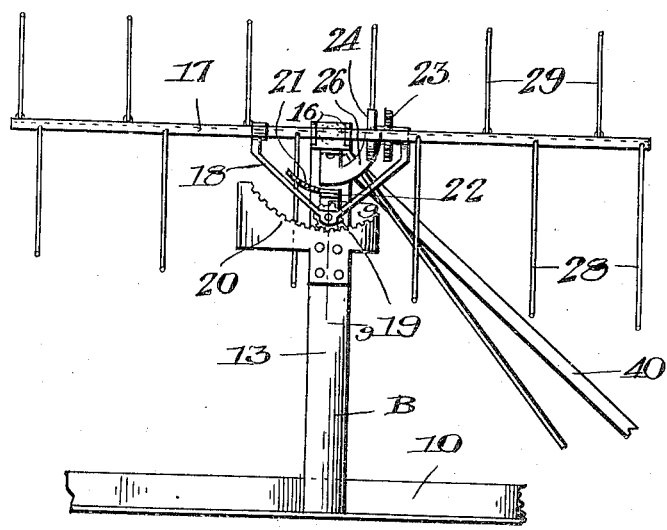
Figure 4 is a side elevation of one of the standards on which the basket is mounted.

A represents a binder deck and B the improved shocker located stubbleward thereof, and connected to the binder mechanism by any suitable means.

The shocker B comprises a frame 10, the rear end of which is supported by the ground wheels 11 while the front is supported by a castor wheel 12.

The frame 10 is provided intermediate of its length and on either side thereof with a pair of vertically extending standards 13 provided at the upper end with journals 14 in which the spindles 15 are mounted. Each of the spindles 15 is provided with a bifurcated end 16 through which the hinge rod 17 of a section of the basket extends. The hinge rod 17 carries a skeleton frame 18 on which the gear 19 is journalled, and this gear intermittently engages with the arcuate rack 20 carried by the standard 13. The standard 13 may be suitably supported by obliquely disposed braces 65.

A second arcuate rack 21 is provided which is supported by the bracket 22 from the standard 13, and this second arcuate rack intermittently engages with the gear 23 carried by the hinge rod 17 of the basket.

Adjacent to the gear 23 on the hinge rod 17, a disc 24 is provided having a flattened edge 25 which co-acts with the guide plate 26 secured to the standard 13 and extending upwardly from the arcuate rack 21.

The basket is formed in two portions, each comprising a plate 27, one of the longitudinal edges of which is attached to a hinge rod 17 and this plate tapers towards the front end, and carries a plurality of downwardly extending arcuate fingers 28, and a plurality of upwardly extending arcuate fingers 29.

When the basket is in open position, the fingers 29 of the two sections are opened to permit of sheaves being delivered to the basket from the elevator conveyor 30, the lower end of which is provided with intermeshing gears 31 whereby rotary motion is transmitted from the shaft 45 to the elevator conveyor.

The upper end of the elevator conveyor overhangs the basket collector and the elevator conveyor is supported by the braces 33 and 34 extending from the shocker frame 10.

The shaft 32 is provided with a gear 35 at one end which meshes with the gear 36 mounted on the intermediate shaft 37, which is journalled on the frame 10, and this intermediate shaft is provided with a pair of discs 38 having crank pins 39 thereon designed to be connected through the rods 40 with the crank arms 41 on the spindles 15.

When the desired number of sheaves have been delivered to the basket collector, a clutch 42 is operated through the manipulation of a lever 42'—connected to the clutch member and extending to within reach of the operator. Through this operation, the shaft 45 is rotated from the binder or other suitable source of power and motion is transmitted through the gears 31 to the elevator conveyor 30. The shaft 32 is rotated from the binder or other suitable source of power and motion is transmitted from the shaft 32 to the intermediate shaft 37 through the gears 35 and 36. The rotation of shaft 37 is transmitted by the rods 40 to the crank arms 41 which rock the spindles 15 so that the basket collector is then rotated in a clockwise direction through somewhat more than a quarter of a circle, as shown in Figure 3.

During this rotation of the basket collector, the gear 19 engages with the arcuate rack 20 thereby governing the speed with which the basket is rotated and when the basket has assumed a vertical position the said gear is disengaged from the arcuate rack. When the basket is approaching a vertical position, the gear 23 meshes with the rack 21 thereby rotating the hinge rods 17 and causing the two portions of the basket collector to open rearwardly.

During this operation the sheaves collected in the basket are dumped in the form of a shock and as the two portions of the basket open they clear the said shock.

When dumping the basket, the shaft 45 will be rendered inoperative through the throwing out of clutch member 42 by the lever 42' so that the elevator conveyer becomes stationary and no sheaves are delivered to the basket collector.

When the dumping operation is completed, then the continued rotation of the shaft 32 will cause the discs 38 to rock the crank arms 41 through the rods 40 to return the basket collector to a horizontal position to receive a fresh number of sheaves to form the same into a stook.

When the basket is in horizontal position the shaft 45 is again rotated to actuate the conveyor through the handling by the operator of the lever 42' which works a clutch 42 so that power may be transmitted to the shaft 45.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:—

1. A shocker of the class described comprising a basket formed in two portions, each portion to consist of a central plate having longitudinally extending tapering edges, fingers on the plates, a frame carried by each plate, a gear on the frame, standards rotatably supporting the basket and an arcuate rack designed to intermittently engage with the gear, a hinge rod for each portion of the basket attached to the plate thereof, a gear on the hinge rod and a rack designed to mesh with the gear rotating the hinge rod.

2. A shocker comprising a basket formed in two portions each portion having a hinge rod, a gear on each hinge rod, a disc on each hinge rod having a flattened edge, a guide co-acting with the disc, a rack meshing with the gear on the hinge rod and means for rotating the basket in a vertical plane, as and for the purposes specified.

3. A shocker comprising a basket formed in two portions, each portion comprising a plate having arcuate fingers on the upper and lower sides thereof, a hinge rod attached to each plate, a gear on each hinge rod, an arcuate rack co-acting with the said gear rod or hinge rod, spindles rotatably supporting each portion of the basket, crank arms on the spindles, means for rocking the crank arms and the spindles, a second gear carried by each portion of the basket and an arcuate rack co-acting with the last said gear.

4. A shocker comprising a basket formed in two portions, a hinge rod for each portion, means for intermittently rotating the hinge rod, means for rotating the hinge rod in a vertical plane, spindles rotatably supporting each portion of the basket and crank arms on the ends of the spindles, as and for the purpose specified.

In witness whereof I have hereunto set my hand in the presence of two witnesses.

JOSEPH THEAKSTON.

Witnesses:
PAPY B. HELMAN,
JAS. BALFOUR.